Oct. 1, 1968   W. K. ROBBINS   3,403,506
CONNECTING LINK FOR CHAINS AND THE LIKE
Filed Jan. 5, 1966
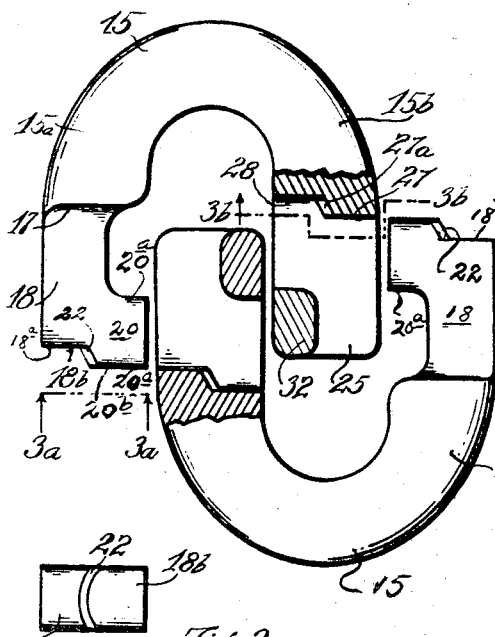
Fig. 1.
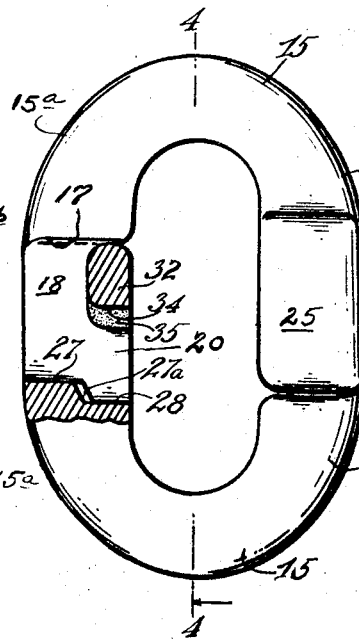
Fig. 2.
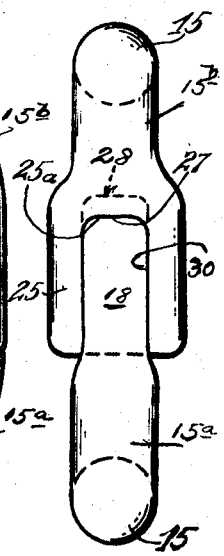
Fig. 3.
Fig. 3a.
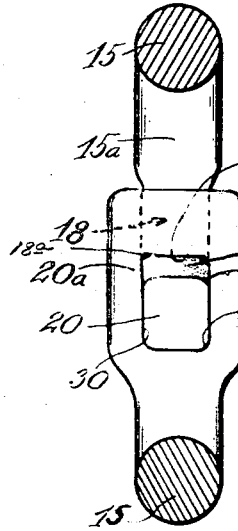
Fig. 4.
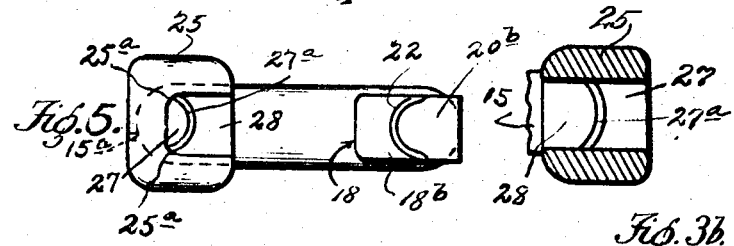
Fig. 5.
Fig. 3b.
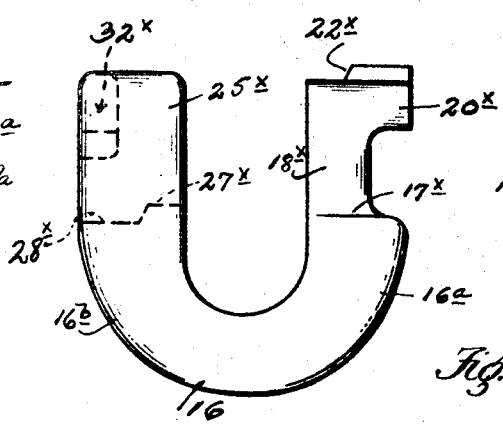
Fig. 6.
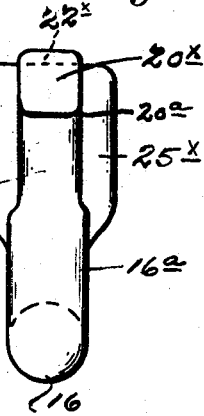
Fig. 7.
Inventor:
Wm. K. Robbins
By Eugene E. Stevens and
Raymond H. Stevens
Attorneys

United States Patent Office 3,403,506
Patented Oct. 1, 1968

3,403,506
CONNECTING LINK FOR CHAINS AND THE LIKE
William K. Robbins, 13453 Moorpark St.,
Sherman Oaks, Calif. 91403
Filed Jan. 5, 1966, Ser. No. 518,838
8 Claims. (Cl. 59—85)

My invention relates broadly to connectors but has particular reference to links designed as replacements in chains, and is an improvement on the link patented by me on Dec. 16, 1962, under No. 2,621,470.

While the general form and assembling of the improved link follow those of the patented one, one object of the improvement is to design the components of the link for assembling by direct lateral movement and without maneuvering or close watching to insure the proper engagement of the link components and also to retain the latter in position by means which will be in compression in service.

Another object is to simplify the link components by eliminating the necessity for stud-carried lugs by more massively building interengaging link section parts.

A further object is to eliminate the necessity for the use of socket-carried groove pins rivets or the like for non-shiftably retaining (while in service) the link section studs in the related sockets of companion link sections, while at the same time achieving a perfect interlocking fit of interengaged link section parts.

Additionally, and more specifically stated, the invention contemplates such as interengaging slanted lap joint-providing link section surfaces in conjunction with weld inserts between other opposed link section surfaces for achieving the end above stated; there being provided a readily accessible molten weld-receiving chamber.

An important object is to simplify the components of the link and therefore reduce the cost of its manufacture.

A better understanding of the improved link may be gained by reference to the accompanying drawing, in which—

FIG. 1 is an elevation of the link components in a position to be assembled;

FIG. 2 is a similar view of the link assembled, one component being shown partly in section;

FIG. 3 is an edge view from the right-hand side of FIG. 2;

FIGS. 3a and 3b are, respectively, sections on the lines 3a—3a and 3b—3b of FIG. 1;

FIG. 4 is a vertical section on the line 4—4 of FIG. 2;

FIG. 5 is a top plan view of the lower half of a modified duplicate section link;

FIG. 6 is an elevation of the modified link section of FIG. 5; and

FIG. 7 is an edge view from the right-hand side of FIG. 6.

Referring to the form of invention of FIGS. 1–5, inclusive, the link sections 15, are identical and are assembled symmetrically. Accordingly, a description of one will suffice for both. Thus the arm 15a of the upper section 15—shown at the left in FIGS. 1 and 2—is reduced as at 17 to form a longitudinally directed prism-shaped terminal portion or plug 18 of substantially square cross-section with preferably rounded corners 18a on the inner side. The plug 18 terminates with an inward stud 20 which is also of substantially square cross-section with all corners 20a rounded. The end of the stud 20 is offset from the end 18b of the plug 18 to provide the axially extending lug 20 by means of an arcuate bevel 22 more clearly illustrated in FIG. 3a. With the second link section 15 in inverted alternation with the first one—as seen in FIG. 1—it follows that the right-hand arm 15a of the lower section 15 has a plug formation identical with the one described, but in return direction.

The other arm 15b of the respective sections extends with a socket 25 of U-shape when viewed from the inner side, and also in cross-section, the latter form being suggested by the finely-dotted line and upper and lower portions of FIG. 3. The socket 25 is open at its free end; and its side walls 25x are parallel and join on the inside with curves 25a to form an inner end wall 27 adjacent to the outer face of the socket 25. The wall 27 has an arcuate bevel 27a forming an offset socket end wall 28; and the latter constitutes one end of an oblong inner face opening of the socket 30, the corners of this opening being rounded as indicated at 30a. The opening 30 extends to the socket side wall (25x) connecting bridge 32.

The components of the link may be assembled by arranging them staggered as in FIG. 1. When the link section components 15 are gathered inwardly from opposite sides, the sockets 25 afford clearances for the plugs 18. When the studs 20 thereof arrive opposite the offset walls 28 of the sockets (see FIG. 2), the components 15 are closed on each other end-wise to seat stud ends 18b on walls 27 and the lug ends 20b on the walls 28 to provide duplicate lap joints 22, 27a per FIG. 2. This leaves a transverse cavity 34 formed between each stud 20 and the opposite related bridge-provided socket wall 32a; and secured in this cavity is a load-sustaining filler, preferably taking the form of a weld 35.

The modification of FIGS. 6 and 7 follows the design of the main embodiment of the link 15, 15, except that each plug 18x of the link sections 16, 16 extends along the inner side of the link with the stud 20x directed outwardly. It follows, therefore, that the open side of each socket 25x also faces inwardly, and the lap joints 22x, 27x are reversed as indicated in FIG. 6.

Note that in FIGS. 6 and 7, 16a, 16b, 17x, 18x, 18x, 20x, 22x, 25x, 27x, 28x and 32x correspond, respectively, to 15a, 15b, 17, 18, 20, 22, 25, 27 28 and 32 in FIGS. 1–5, inclusive.

It will now be apparent that the improved link has a number of advantageous features. One is that a clear assembling path is afforded the link components when they are arranged as in FIG. 1, since the socket of each component presents its open face as an entrance for the stud and plug of the complementary component; and the bridge 32 of each component separates from that of the other component during the assembling movement to become aligned with the stud of such other component, one instance of this appearing in the left-hand portion of FIG. 2.

Further to be noted is the fact that the improved link creates the wide cavity (see FIG. 4) for a large weld 35 which is in compression in service. This weld 35 not only strengthens the link at the joints, but fortifies the components against angular stresses without the need of additional safeguards. Also, said weld, being in compression, will not be displaced in service.

Further, with the welds in the link lodged to fill the cavities 34, the lap joints lock the link components and welds against side stresses, the joints maintaining the components in positive alignment at all times. Fnally, the features of the link are contained in its basic structure, where they gain strength from its massive build and retain the link in rigid and compact form.

Having thus described my invention, what I claim is:
1. A connector comprising in combination two separable elongated sections having terminal portions adapted for assembly with one another to dispose said sections in axial continuation of each other, the terminal of the first section constituted by a laterally opening side wall-providing socket and the second section terminal constituted by a laterally projecting stud which is laterally movable into the socket of said first section; said stud and socket having transverse longitudinal load-sustaining shoulders providing planar portions disposed substantially normal to the connector axis, the stud having an axial extension lug and the socket having an axially extending recess receiving said extension lug of said stud whereby said planar stud and socket shoulders will be spacedly opposed with respect to one another when the sections are assembled with the stud lug located in said socket recess, opposed transverse steps provided by said lug and socket recess and engaging to provide a joint that prevents relative lateral movement of said sections when fully assembled, and an insert element secured in the space between said planar shoulders and engaging each of the latter whereby to be under compression when the connector is under longitudinal load so as to be retained in place to maintain said sections against relative longitudinal separating movement, so that the connector sections will not separate in service.

2. The structure of claim 1, and said connector comprising a replacement chain link, each section which duplicates said terminal portions, and said joints being of the lap-type.

3. The structure of claim 1, and said connector comprising a replacement chain link, each section which duplicates said terminal portions, and said joints being of the lap-type, each of said joints comprising beveled interengaging surfaces.

4. The structure of claim 1, and said connector comprising a replacement chain link, each section which duplicates said terminal portions, and said joints being of the lap-type, each of said joints comprising beveled interengaging surfaces, with said joint surfaces arcuate.

5. The structure of claim 1, and the space between said planar stud and socket shoulders cooperating with the socket side walls to provide a sidewardly open chamber having its inner end closed by a portion of the second section terminal; and insert element comprising welding material received in said chamber.

6. The structure of claim 5, and said connector comprising a replacement chain link, each section which duplicates said terminal portions, and said joints being of the lap-type.

7. The structure of claim 5, and said connector comprising a replacement chain link, each section which duplicates said terminal portions, and said joints being of the lap-type, each of said joints comprising beveled interengaging surfaces.

8. The structure of claim 5, and said connector comprising a replacement chain link, each section which duplicates said terminal portions, and said joints being of the lap-type, each of said joints comprising beveled interengaging surfaces, with said joint surfaces arcuate.

References Cited

UNITED STATES PATENTS

| | | | |
|---|---|---|---|
| 2,385,232 | 9/1945 | Robbins | 59—85 |
| 2,621,470 | 12/1952 | Robbins | 59—85 |
| 2,761,275 | 9/1956 | Robbins | 59—85 |
| 3,031,219 | 4/1962 | Robbins | 59—85 |
| 3,139,720 | 7/1964 | Robbins | 59—84 |

CHARLES W. LANHAM, *Primary Examiner.*

G. P. CROSBY, *Assistant Examiner.*